US009123448B2

(12) United States Patent
Sellier et al.

(10) Patent No.: US 9,123,448 B2
(45) Date of Patent: Sep. 1, 2015

(54) METHOD FOR TREATING A CLADDING CONTAINING SINTERED CALCIUM HYDRIDE

(71) Applicant: COMMISSARIAT A L'ENERGIE ATOMIQUE ET AUX ENERGIES ALTERNATIVES, Paris (FR)

(72) Inventors: Serge Sellier, Puimoisson (FR); Arnaud Leclerc, Manosque (FR); Janick Verdelli, Pertuis (FR); Joël Godlewski, Aix en Provence (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/356,207

(22) PCT Filed: Nov. 11, 2012

(86) PCT No.: PCT/FR2012/052541
§ 371 (c)(1),
(2) Date: May 5, 2014

(87) PCT Pub. No.: WO2013/064785
PCT Pub. Date: May 10, 2013

(65) Prior Publication Data

US 2014/0309473 A1 Oct. 16, 2014

(30) Foreign Application Priority Data

Nov. 3, 2011 (FR) ..................................... 11 59939

(51) Int. Cl.

| | |
|---|---|
| ***G21F 9/30*** | (2006.01) |
| ***G21F 9/34*** | (2006.01) |
| ***G21F 9/28*** | (2006.01) |
| ***B01D 53/62*** | (2006.01) |
| ***C01F 11/18*** | (2006.01) |

(52) U.S. Cl.
CPC ... *G21F 9/30* (2013.01); *G21F 9/28* (2013.01)

(58) Field of Classification Search
None
See application file for complete search history.

(56) References Cited

U.S. PATENT DOCUMENTS

| | | | | |
|---|---|---|---|---|
| 2,952,535 A | 9/1960 | Roake | | |
| 3,803,043 A * | 4/1974 | Magladry et al. | ............. | 252/625 |
| 2008/0003164 A1 * | 1/2008 | Carra et al. | ................... | 423/421 |
| 2011/0098521 A1 | 4/2011 | Sellier et al. | | |

FOREIGN PATENT DOCUMENTS

| | | | | |
|---|---|---|---|---|
| EP | 0088877 * | 9/1983 | .............. | G21C 5/12 |
| FR | 2859042 A1 | 2/2005 | | |
| WO | 2011011293 A1 | 1/2011 | | |

* cited by examiner

*Primary Examiner* — Stanley Silverman
*Assistant Examiner* — Daniel Berns
(74) *Attorney, Agent, or Firm* — Browdy and Neimark, PLLC

(57) ABSTRACT

A method for treating a cladding within which there is a sintered material composed wholly or partly of sintered calcium hydride, the method comprising a step during which the sintered material is contacted with a reaction mixture comprising steam, carbon dioxide, and a chemically inert gas, the contacting being carried out for a duration allowing the sintered calcium hydride to be converted into a calcium carbonate powder.
The treatment method provided by the invention results in a chemically inert waste, a limitation on the volume of wastes obtained, while allowing the removal or even recovery of these wastes by appropriate processing streams.

12 Claims, 2 Drawing Sheets

METHOD FOR TREATING A CLADDING CONTAINING SINTERED CALCIUM HYDRIDE

TECHNICAL FIELD

The present invention is situated within the field of the treatment of nuclear wastes.

It pertains more particularly to the treatment of a cladding containing sintered calcium hydride ($CaH_2$).

TECHNICAL BACKGROUND

As part of irradiation studies performed in a fast-neutron nuclear reactor (FNR), sintered calcium hydride is used, and acts as a moderator of the nuclear fission reaction.

This material is present generally in the form of wafer cores which are stacked in an impervious cylindrical cladding made of steel.

When the irradiation studies have been performed, a cladding is obtained within which there are wafer cores presenting both a radiological risk (presence of radioactive substance such as a substance containing tritium) and also a chemical risk, since, on contact with water, calcium hydride gives off hydrogen, which is an extremely flammable gas.

The processing stream for the treatment of nuclear wastes requires the chemical risk to be neutralized while the volume of the wastes is reduced as far as possible, and their subsequent conditioning is optimized.

In order to respond to this twofold requirement, therefore, it would be desirable to have a treatment at the end of which, on the one hand, the wastes stemming from the cladding, and, on the other hand, the wastes stemming from the irradiated calcium hydride wafer cores, are removed by processing streams appropriate to the nature of each waste.

In practice, this requires that any pollution, particularly radioactive pollution, of one waste by another should as far as possible be limited.

If such a result is achieved, this has the advantageous effect of allowing:

- the cladding to be removed to a processing stream in which waste management is simplified by the absence of radioactive substance, or even allows this cladding to be recycled (transformation or re-use);
- management of the waste stemming from the irradiated calcium hydride wafer cores, in the form of a waste product suitable for the processing streams for removal of radioactive wastes.

SUMMARY OF THE INVENTION

One of the aims of the invention is to provide a method for treating a cladding containing sintered calcium hydride and possibly a radioactive substance, having all or some of the aforementioned advantages.

The present invention accordingly provides a method for treating a cladding, within which there is a sintered material composed wholly or partly of sintered calcium hydride that may optionally contain at least one radioactive substance. The method comprises a step during which the sintered material is contacted with a reaction mixture containing in molar percentages 0.5% to 5% of steam, 5% to 25% of carbon dioxide, and 74.5% to 94.5% of a chemically inert gas, in other words a gas preventing reaction of the oxygen (which may possibly be present in the reaction atmosphere) with hydrogen (which is produced by the carbonation reaction described below).

The contacting is carried out for a duration allowing the whole of the sintered calcium hydride to be converted into a calcium carbonate powder. This conversion may therefore be interrupted and restarted at a time selected by the operator, or its kinetics may be modified depending on the amount of reaction mixture injected.

A particular feature of the treatment method of the invention is the conversion of the sintered calcium hydride into a calcium carbonate powder which does not adhere to the cladding walls and is chemically inert.

This particular feature derives, among others, from the specific composition of the reaction mixture, and from the fact that the conversion of the sintered calcium hydride into a calcium carbonate powder results in the structure of the sintered material being destroyed.

The non-adherent powder obtained at the outcome of the treatment method of the invention, and comprising calcium carbonate, is therefore extracted naturally from the cladding by simple gravity, together, where appropriate, with the radioactive substance and/or any other substance that it contains.

This non-adhering quality provides optimum prevention of the spread of radioactive substance possibly present in the calcium carbonate powder, and of contamination of the cladding by retention of material.

This also allows the entirety of the sintered material to be treated, in spite of its solid character and its confinement within the cladding. The reason is that, although the sintered calcium hydride undergoes surface reaction, its disaggregation in the form of a non-adherent powder allows permanent regeneration of a new reactive surface of sintered calcium hydride. Since the calcium carbonate powder is extracted from the cladding by simple gravity, the treatment is able to continue naturally, without human intervention, and can be conducted until conversion of the solid sintered material is complete.

Given that the chemical risk associated with calcium hydride has been eliminated, the calcium carbonate powder can be removed to a conventional processing stream or a processing stream suitable for radioactive wastes.

The other wastes obtained during the treatment of the invention also include a gaseous waste such as, for example, hydrogen ($H_2$), possibly in tritiated form (HT), and/or tritium ($T_2$). This gaseous effluent may be extracted during or at the end of the treatment method.

More particularly, when the radioactive substance optionally present is in gaseous form (such as tritiated hydrogen or tritium) at the end of the treatment, it is removed as gaseous radioactive effluent.

In that case there is no longer any radioactive substance remaining in the calcium carbonate powder. The possible initial presence of radioactive substance nevertheless necessitates the removal of this powder to a simplified processing stream suitable for radioactive wastes, which is, however, less constraining than the one which would be necessary if a radioactive substance were effectively present in the waste for removal.

The cladding itself is not impaired or destroyed during the treatment of the invention, because calcium carbonate is a relatively chemically inert compound and its formation is accompanied by limited expansion.

Moreover, since calcium carbonate powder does not adhere, the cladding suffers little or no contamination by traces of calcium carbonate or of any other, possibly radioactive, substance it contains.

The cladding may therefore be removed to a simplified processing stream suitable for radioactive wastes, in order to be disposed of or recycled in the nuclear industry.

This separation of the processing streams reduces the volume of the wastes, since obtaining a powder allows compact packing, and the cladding may optionally be recycled.

The result of producing a non-adhering powder is therefore that the method of the invention allows complete treatment of the cladding and its contents, and a limit in the volume of the wastes obtained, while ensuring the removal and even recovery of these wastes by suitable processing streams.

DETAILED DESCRIPTION OF THE INVENTION

Because of its operational simplicity, the method of the invention allows the treatment, with a minimum of handling, of a cladding containing a sintered material, and this proves particularly advantageous when this material contains at least one radioactive substance.

The sintered material comprises sintered calcium hydride and optionally at least one radioactive substance.

The radioactive substance is, for example, a substance containing elemental tritium (T).

The treatment method of the invention comprises a step during which the sintered material is contacted with a reaction mixture containing in molar percentages 0.5% to 5% of steam, 5% to 25% of carbon dioxide, and 74.5% to 94.5% of an inert gas.

A suitable gas is any gas which is chemically inert toward calcium hydride. The inert gas is chosen, for example, from nitrogen, argon, or mixtures thereof.

The nature and the proportion of the components in the reaction mixture permit controlled and complete treatment of the sintered calcium hydride, in accordance with the following overall carbonation reaction:

$$CaH_{2(s)}+2H_2O_{(l)}\rightarrow Ca(OH)_{2(s)}+2H_{2(g)}$$

The carbon dioxide then reacts with the calcium hydroxide:

$$Ca(OH)_{2(s)}+CO_{2(g)}\rightarrow CaCO_3,H_2O_{(s)}$$

The duration for which the reaction mixture is contacted with the sintered calcium hydride depends on the amount of calcium hydride and on the composition of the reaction mixture. The skilled person is able easily to adapt this duration, among others, by extending it until full treatment of the cladding is obtained, which is manifested, for example, in the end of emission of a gas such as hydrogen.

The contact duration is, for example, at least 1 day, typically between 1 day and 15 days for amounts of sintered calcium hydride to be treated that are of the order of the hectogram.

The contacting is preferably carried out at a temperature of between 40° C. and 55° C., in order, among others, to adjust the molar percentage of steam to prevent the water condensing and reacting violently with the calcium hydride.

When the sintered material contains at least one radioactive substance, the treatment according to the invention is usually performed in a confinement enclosure such as a glove box or a hot cell.

In that case the reaction mixture is generally introduced into the confinement enclosure at a rate allowing it to be renewed continuously at least once an hour.

The way in which the reaction propagates, by successive conversions in pulverulent form of the sintered material, allows treatment of a cladding wherein this material is relatively inaccessible, such as a cladding with complex geometry or substantial size, for example.

The reason is that, during the carbonation reaction, the sintered calcium hydride undergoes conversion into a calcium carbonate powder, but the production of this powder does not limit the kinetics of the reaction, and this allows the entirety of the sintered calcium hydride present in the cladding to be treated.

It is nevertheless appropriate to ensure that the sintered material is able to be in contact with the reaction mixture. Furthermore, this contacting allows the calcium hydride powder to be extracted from the cladding. When the cladding is impervious, it is necessary in this case to make at least one opening in it, by drilling or cutting of the cladding, for example.

The cladding may be in inclined or vertical position, in order to promote the gravity extraction of the calcium carbonate powder (and, where appropriate, of any substance it contains).

At the outcome of the treatment method of the invention, various wastes are obtained:

- The sintered calcium hydride is converted into a calcium carbonate powder containing, where appropriate, the radioactive substance or substances and/or any other substance initially present in the sintered material or resulting from its treatment. This powder exhibits no chemical reactivity at all toward water and air. In the absence of radioactive substance, it may be removed as it is to a conventional processing stream. In the presence of radioactive substance, it may be incorporated into glass or cement, or dissolved in the form of $Ca(HCO_3)_2$ in the majority of the acids used in the nuclear wastes treatment processing stream.
- Where appropriate, the gases produced during the treatment method of the invention (for example, hydrogen, optionally in tritiated form, and/or tritium) may be extracted as gaseous effluents and removed to a specific processing stream in order to be treated.
- The cladding is usually intact or has not suffered any major impairment. In this regard, in order to limit the impact of the reaction mixture on the cladding, this one may be composed of metal (preferably a steel), of plastic, or of ceramic.

Other objects, features, and advantages of the invention will now be specified in the description hereinbelow of one particular embodiment of the method of the invention, which is given by way of illustration and not of limitation, with reference to appended FIGS. 1 to 4.

DESCRIPTION OF ONE PARTICULAR EMBODIMENT

The example which follows relates to the treatment of a steel cladding. It is representative for a section of a cladding coming from a FNR nuclear reactor, which would be cut at an upper and a lower part.

The treated cladding is composed of an inner tube positioned along the axis of an outer tube. It contains four wafer cores obtained after the sintering of calcium hydride.

The purity of the calcium hydride is 99% by mass. The impurities, in the form of traces, are composed essentially of aluminum and magnesium.

The dimensions of the cladding and of a wafer core are as follows:

outer tube: height=85 mm, outer diameter=116 mm, inner diameter=113 mm;

inner tube: height=85 mm, outer diameter=49 mm, inner diameter=46 mm;

calcium hydride wafer core: thickness=20 mm, outer diameter=112.5 mm, inner diameter=49.5 mm.

The assembly is held by placing the lower part of the cladding on a removable grid situated above a recovery tank.

In this example, the calcium hydride wafer cores do not contain radioactive substance.

The cladding is placed in a glove box with a volume of 550 liters, which serves as a reaction chamber. The temperature is regulated at 43° C.

A reaction mixture is introduced into it continuously at a rate of 12 liters per minute.

This mixture is composed, in volume percentage terms, of 2.5% of steam, 10% of carbon dioxide, and the remainder being nitrogen as an inert gas.

Its composition is analyzed upstream and downstream of the glove box, by gas chromatography, in order to determine the content of the following gases: $N_2$, $CO_2$, $O_2$, $H_2$. The steam content introduced is measured using a Peltier-type mirror hygrometer.

As a safety measure, the amount of hydrogen produced is also monitored permanently by an explosimeter. In the event of any breaching of the threshold set by this detector (60% of the LEL, this being the Lower Explosive Limit of hydrogen in air), the carbonation reaction can be halted by stopping the introduction of the reaction mixture and replacing it entirely with inert gas.

The carbonation reaction may be resumed in accordance with its initial regime by reintroducing steam and carbon dioxide into the glove box, with no adverse effect on the overall efficiency of the treatment method.

The method of the invention therefore allows secured and controlled treatment.

The contacting between the reaction mixture and the sintered calcium hydride takes place primarily at the outer face of the first and final wafer cores, but also, to less of an extent, on the inner and outer perimeter of the wafer cores, which is at a distance of 0.5 mm from the opposite surfaces of the cladding.

Figure 1:
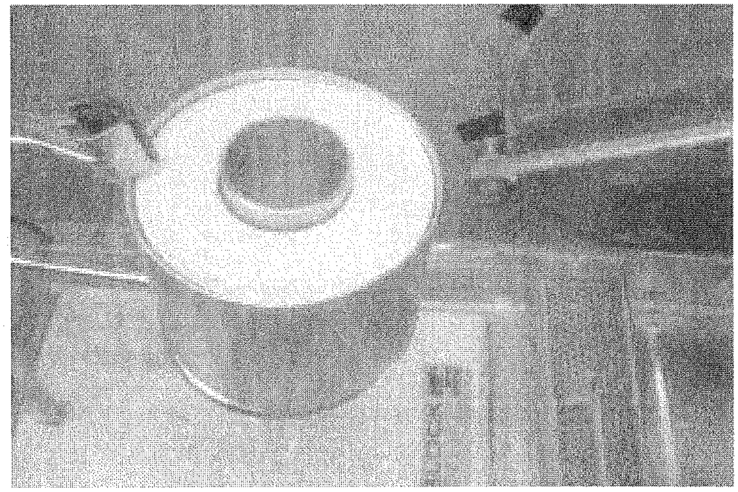
FIGS. 1, 2, 3, and 4 represent photographs taken during the treatment of a cladding by the method of the invention, with the cladding containing sintered pellets of calcium hydride.
Figure 2:
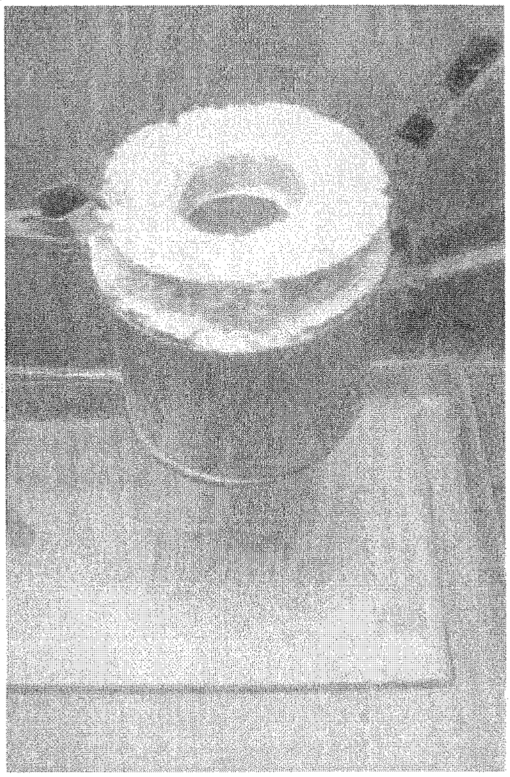
Figure 3:
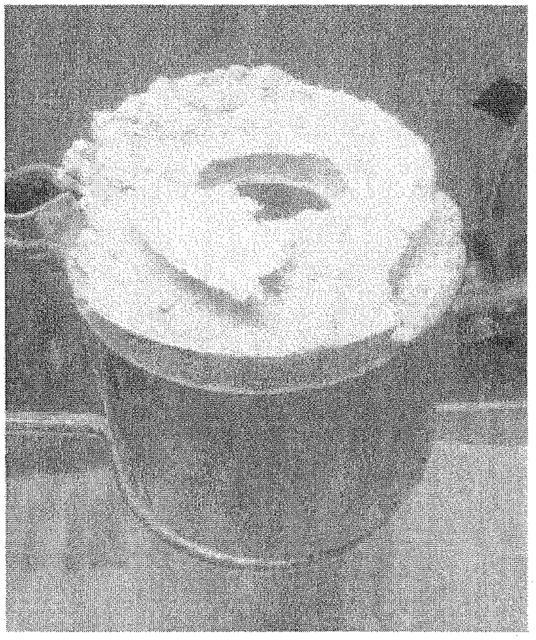
Figure 4:
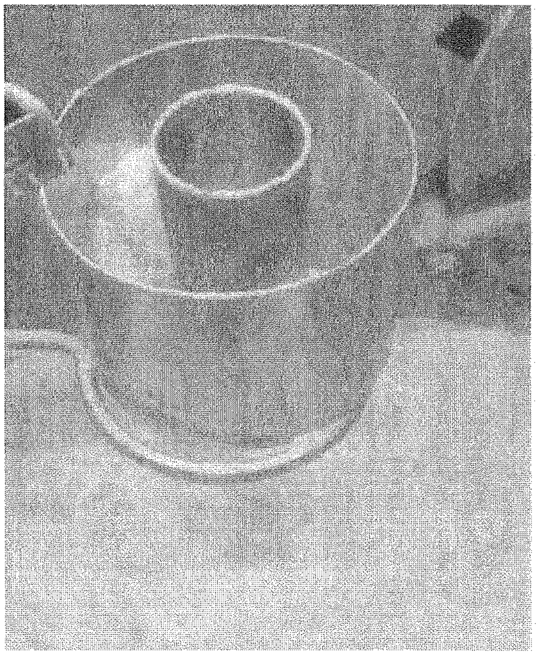

The progress of the treatment is monitored visually. FIGS. 1, 2, 3, and 4 show the photographs taken, respectively, at the following times: introduction of the reaction mixture into the glove box (time to), to +2 days, to +4 days, to +14 days.

These figures show that the sintered calcium hydride wafer cores undergo gradual de-aggregation into the form of calcium carbonate powder. This conversion gives rise to a limited volume expansion, which ensures that the cladding is not impaired or destroyed.

The vertical position of the cladding allows the calcium carbonate powder to drop spontaneously, along with any other substance it contains, such as, for example, the impurities initially present in the wafer cores.

The consequence is a natural increase in the contact surface area of the sintered calcium hydride not yet treated with the reaction mixture. Simultaneously and temporarily, chromatographic measurements show that the consumption of steam and the production of hydrogen increase owing to acceleration in the kinetics of the carbonation reaction. The falling of the powder allows contact between the reaction mixture and the calcium hydride to be facilitated and maintained.

On the basis of stoichiometric coefficients for the carbonation reaction, it is possible, by monitoring the amount of hydrogen given off during the carbonation reaction, to calculate the mass of sintered calcium hydride which is converted.

These calculations, and the observation of the progression of the treatment, indicate that virtually all of the sintered calcium hydride (926 g out of 980 g) is converted after 18 days into calcium carbonate powder.

The residual mass of calcium hydride is in the recovery tank. It may be converted in turn by extending the duration of treatment.

At the end of this treatment, the metal cladding emptied of its contents, the calcium carbonate powder, and the hydrogen are removed in separate processing streams.

From the foregoing description it is apparent that the treatment method of the invention allows complete treatment of a cladding within which there is a sintered material composed wholly or partly of sintered calcium hydride and optionally containing at least one radioactive substance, while limiting the volume of the wastes obtained, and while allowing the removal or even recovery of these wastes by suitable processing streams.

The invention claimed is:

1. A method for treating a cladding within which there is a sintered material composed wholly or partly of sintered calcium hydride, the method comprising a step during which the sintered material is contacted with a reaction mixture containing in molar percentages 0.5% to 5% of steam, 5% to 25% of carbon dioxide, and 74.5% to 94.5% of a chemically inert gas, the contacting being carried out for a duration allowing the sintered calcium hydride to be converted into a calcium carbonate powder.

2. Treatment method according to claim 1, wherein the sintered material contains at least one radioactive substance.

3. Treatment method according to claim 2, wherein the radioactive substance is a substance containing elemental tritium.

4. Treatment method according to claim 1, wherein the cladding is composed of metal, plastic, or ceramic.

5. Treatment method according to claim 1, wherein the inert gas is chosen from nitrogen, argon, or mixtures thereof.

6. Treatment method according to claim 1, wherein the contacting is carried out at a temperature of between 40° C. and 55° C.

7. Treatment method according to claim 1, wherein the method is performed in a confinement enclosure.

8. Treatment method according to claim 7, wherein the confinement enclosure is a glove box or a hot cell.

9. Treatment method according to claim 7, wherein the reaction mixture is introduced into the confinement enclosure at a rate allowing it to be renewed continuously at least once an hour.

10. Treatment method according to claim 1, wherein the cladding is in inclined or vertical position, in order to promote the gravity extraction of the calcium carbonate powder.

11. Treatment method according to claim 1, wherein a gaseous effluent is extracted during or at the end of the treatment method.

12. Treatment method according to claim 11, wherein the gaseous effluent is radioactive.

* * * * *